United States Patent
Nakai

(10) Patent No.: US 10,532,584 B2
(45) Date of Patent: Jan. 14, 2020

(54) LASER SCANNING DEVICE, IMAGE FORMING APPARATUS, REFLECTION SURFACE IDENTIFICATION METHOD

(71) Applicant: KYOCERA Document Solutions Inc., Osaka-shi, Osaka (JP)

(72) Inventor: Jun Nakai, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 16/090,694

(22) PCT Filed: Oct. 17, 2017

(86) PCT No.: PCT/JP2017/037487
§ 371 (c)(1),
(2) Date: Oct. 2, 2018

(87) PCT Pub. No.: WO2018/079336
PCT Pub. Date: May 3, 2018

(65) Prior Publication Data
US 2019/0118555 A1    Apr. 25, 2019

(30) Foreign Application Priority Data
Oct. 26, 2016 (JP) .................. 2016-209350

(51) Int. Cl.
*B41J 2/47* (2006.01)
*G03G 15/04* (2006.01)
(Continued)

(52) U.S. Cl.
CPC ............ *B41J 2/471* (2013.01); *G02B 26/122* (2013.01); *G03G 15/04072* (2013.01);
(Continued)

(58) Field of Classification Search
CPC . B41J 2/471; G03G 15/04072; G03G 15/043; H04N 1/113; G02B 26/122; G02B 26/12; G02B 26/121; G02B 26/127
See application file for complete search history.

(56) References Cited

U.S. PATENT DOCUMENTS

2008/0166150 A1* 7/2008 Osada ................ G02B 26/122
399/66
2013/0222508 A1 8/2013 Ogasahara
(Continued)

FOREIGN PATENT DOCUMENTS

JP    2013174751 A    9/2013

*Primary Examiner* — John Zimmermann
(74) *Attorney, Agent, or Firm* — Alleman Hall Creasman & Tuttle LLP

(57) ABSTRACT

An image forming apparatus includes: a speed setting portion configured to set a rotation speed of a drive motor to one of a plurality of predetermined specific speeds; a measurement processing portion configured to, in each of a plurality of detection cycles in which light is detected after scanning by a polygon mirror, measure an interval between a detection timing of the light and an output timing at which a drive signal input to the drive motor of the polygon mirror first after the detection timing, is output; and an identification processing portion configured to identify a reference reflection surface that corresponds to a reference interval, based on the measured interval and the reference interval corresponding to a specific speed at a time when the measured interval was measured, the reference interval being among reference intervals that have been set in advance for each of the specific speeds.

10 Claims, 7 Drawing Sheets

(51) Int. Cl.
  *H04N 1/113* (2006.01)
  *G02B 26/12* (2006.01)
  *G03G 15/043* (2006.01)

(52) U.S. Cl.
  CPC ............. *H04N 1/113* (2013.01); *G02B 26/12* (2013.01); *G02B 26/121* (2013.01); *G02B 26/127* (2013.01); *G03G 15/043* (2013.01)

(56) References Cited

U.S. PATENT DOCUMENTS

| | | | |
|---|---|---|---|
| 2017/0010558 A1* | 1/2017 | Ishidate | B41J 2/47 |
| 2017/0343922 A1* | 11/2017 | Kyogoku | G02B 26/123 |
| 2018/0017889 A1* | 1/2018 | Seki | G03G 15/043 |
| 2018/0024461 A1* | 1/2018 | Hotogi | G03G 15/043 |
| | | | 347/118 |

* cited by examiner

LASER SCANNING DEVICE, IMAGE FORMING APPARATUS, REFLECTION SURFACE IDENTIFICATION METHOD

TECHNICAL FIELD

The present invention relates to a laser scanning device including a rotary polygon mirror, an image forming apparatus including a laser scanning device, and a reflection surface identification method executed in a laser scanning device.

BACKGROUND ART

In an electrophotographic image forming apparatus, light emitted from a light source based on image data is scanned over a photoconductor drum by a rotary polygon mirror, and an electrostatic latent image corresponding to the image data is formed on the photoconductor drum. In this type of image forming apparatus, a light emission timing corresponding to each line of image data, namely, an electrostatic latent image writing timing is determined based on a light detection timing at which the light emitted from the light source and scanned by the rotary polygon mirror is detected by a light detecting portion.

In addition, there is known a related technique configured to identify a reflection surface of the rotary polygon mirror based on the light detection timing at which the light is detected by the light detecting portion, and an output timing at which a drive signal is output, the drive signal being to be input to a drive motor that rotates the rotary polygon mirror (see PTL 1). Specifically, according to the related technique, an interval between a detection timing at which light is detected by the light detecting portion and an output timing at which a drive signal is output, is measured in each detection cycle in which light is detected by the light detecting portion, and a reflection surface of the rotary polygon mirror is identified based on whether a measured interval matches a reference interval that corresponds to a predetermined reference reflection surface.

CITATION LIST

Patent Literature

PTL 1 Japanese Patent Application Publication No. 2013-174751

SUMMARY OF THE INVENTION

Problems to be Solved by the Invention

Meanwhile, when the rotation speed of the drive motor is changed, the interval between the light detection timing and the drive signal output timing may not regularly change in correspondence with the change of the rotation speed of the drive motor, wherein the light detection timing is a timing at which light is detected by the light detecting portion, and the interval is measured in each of the detection cycles in which light is detected by the light detecting portion. Accordingly, in a case where a reflection surface of the rotary polygon mirror is identified based on the reference interval corresponding to a specific rotation speed, as in the related technique, a change of the rotation speed of the drive motor may decrease the accuracy of identifying a reflection surface of the rotary polygon mirror.

The present invention has been made in view of such conventional circumstances, and it is an object of the present invention to provide a laser scanning device, an image forming apparatus, and a reflection surface identification method that can prevent the accuracy of identifying a reflection surface of a rotary polygon mirror from decreasing in response to a change of a rotation speed of a drive motor.

Solution to the Problems

A laser scanning device according to an aspect of the present invention includes a light source, a rotary polygon mirror, a drive motor, a light detecting portion, a speed setting portion, a measurement processing portion, and an identification processing portion. The rotary polygon mirror has a plurality of reflection surfaces that reflect light emitted from the light source, and rotates such that the light is scanned by the plurality of reflection surfaces in sequence. The drive motor has magnetic poles of a number that is mutually prime to and larger than a number of the plurality of reflection surfaces, and causes the rotary polygon mirror to rotate. The light detecting portion detects the light scanned by the rotary polygon mirror, at a predetermined detection position inside a scanning area in which the rotary polygon mirror scans the light. The speed setting portion sets a rotation speed of the drive motor to one of a plurality of predetermined specific speeds. The measurement processing portion, in each of a plurality of detection cycles in which the light is detected by the light detecting portion, measures, as a measured interval, an interval between a detection timing at which the light is detected by the light detecting portion and an output timing at which a drive signal that is to be input to the drive motor first after the detection timing, is output. The identification processing portion identifies a predetermined reference reflection surface among the plurality of reflection surfaces, based on the measured interval measured by the measurement processing portion and a reference interval that corresponds to a rotation speed of the drive motor at a time when the measured interval was measured by the measurement processing portion, the reference interval being among a plurality of reference intervals that have preliminarily been set in correspondence with the plurality of predetermined specific speeds and are each an interval between the detection timing and the output timing.

An image forming apparatus according to another aspect of the present invention includes the laser scanning device.

A reflection surface identification method according to a further aspect of the present invention is executed in a laser scanning device which includes a light source, a rotary polygon mirror having a plurality of reflection surfaces that reflect light emitted from the light source and configured to rotate such that the light is scanned by the plurality of reflection surfaces in sequence, a drive motor having magnetic poles of a number that is mutually prime to and larger than a number of the plurality of reflection surfaces and configured to cause the rotary polygon mirror to rotate, and a light detecting portion configured to detect the light scanned by the rotary polygon mirror, at a predetermined detection position inside a scanning area in which the rotary polygon mirror scans the light. The reflection surface identification method includes a setting step, a measuring step, and an identifying step. In the setting step, a rotation speed of the drive motor is set to one of a plurality of predetermined specific speeds. In the measuring step, in each of a plurality of detection cycles in which the light is detected by the light detecting portion, an interval between a detection timing at which the light is detected by the light detecting portion and an output timing at which a drive signal that is to be input to the drive motor first after the detection timing, is output, is measured as a measured interval. In the identifying step, a predetermined reference reflection surface among the plurality of reflection surfaces is identified based on the measured interval measured by the measuring step and a reference interval that corresponds to a rotation speed of the drive motor at a time when the measured interval was measured by the measuring step, the reference interval being among a plurality of reference intervals that have preliminarily been set in correspondence with the plurality of predetermined specific speeds and are each an interval between the detection timing and the output timing.

Advantageous Effects of the Invention

According to the present invention, it is possible to provide a laser scanning device, an image forming apparatus, and a reflection surface identification method that can prevent the accuracy of identifying a reflection surface of a rotary polygon mirror from decreasing in response to a change of a rotation speed of a drive motor.

DESCRIPTION OF EMBODIMENTS

The following describes embodiments of the present invention with reference to the accompanying drawings for the understanding of the invention. It should be noted that the following embodiments are examples of specific embodiments of the present invention and should not limit the technical scope of the present invention.

First Embodiment

Figure 1:
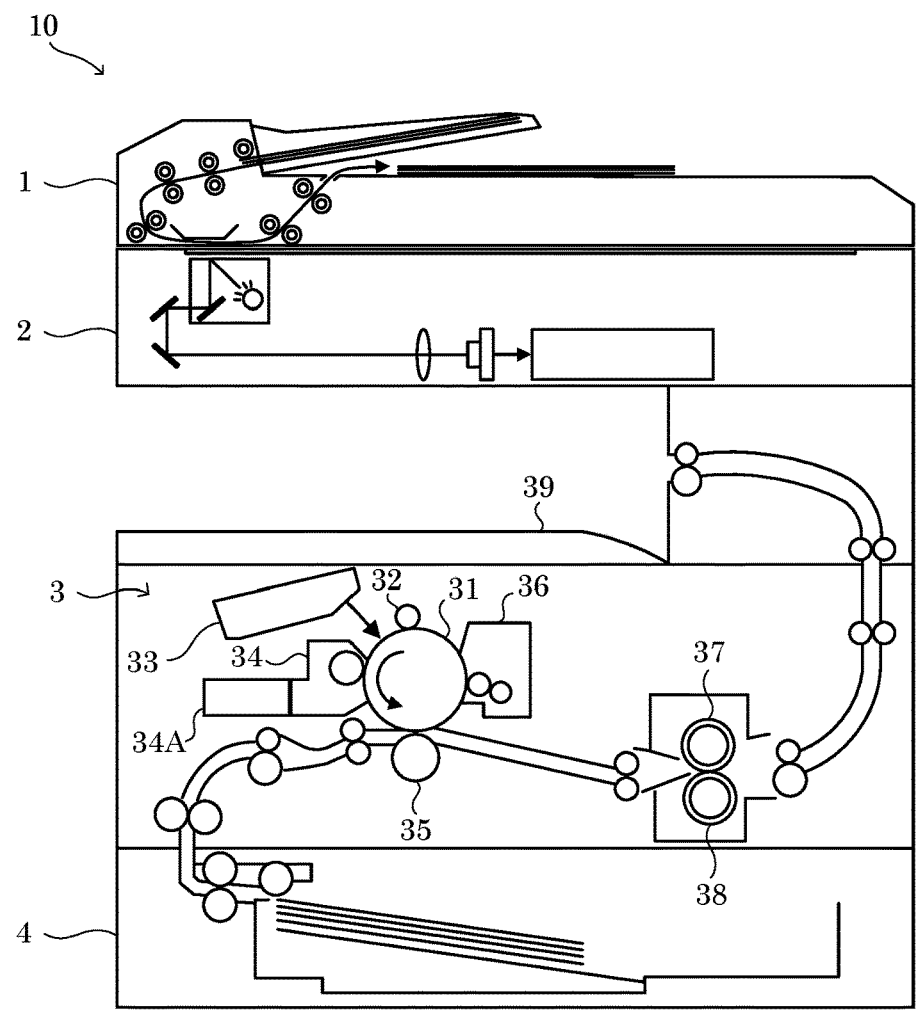
FIG. 1 is a diagram showing a configuration of an image forming apparatus according to a first embodiment of the present invention.
Figure 2:
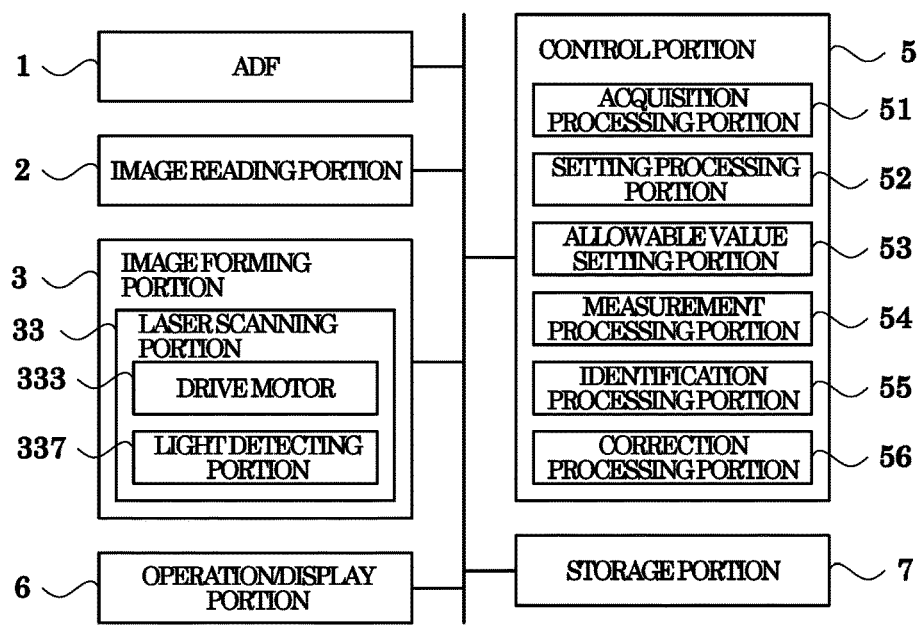
FIG. 2 is a block diagram showing a system configuration of the image forming apparatus according to the first embodiment of the present invention.

First, a description is given of an outlined configuration of an image forming apparatus 10 according to a first embodiment of the present invention with reference to FIG. 1 and FIG. 2. Here, FIG. 1 is a schematic cross-sectional diagram showing the configuration of the image forming apparatus 10.

The image forming apparatus 10 is a multifunction peripheral having a plurality of functions such as: a scan function for reading image data from a document sheet; a print function for forming an image based on the image data; a facsimile function; and a copy function. It is noted that the present invention is applicable to image forming apparatuses such as a printer device, a facsimile device, and a copier.

As shown in FIG. 1 and FIG. 2, the image forming apparatus 10 includes an ADF 1, an image reading portion 2, an image forming portion 3, a sheet feed portion 4, a control portion 5, an operation/display portion 6, and a storage portion 7.

The ADF 1 includes a document sheet setting portion, a plurality of conveyance rollers, a document sheet pressing, and a sheet discharge portion, and is an automatic document sheet feeder for conveying a document sheet so that the document sheet is read by the image reading portion 2. The image reading portion 2 includes a document sheet table, a light source, a plurality of mirrors, an optical lens, and a CCD (Charge Coupled Device), and is configured to read image data from a document sheet.

The image forming portion 3 is configured to execute an image forming process (printing process) in which to form an image by the electrophotographic system based on image data read by the image reading portion 2, or image data input from an external information processing apparatus such as a personal computer. Specifically, as shown in FIG. 1, the image forming portion 3 includes a photoconductor drum 31 (an example of the image carrier of the present invention), a charging equipment 32, a laser scanning portion 33, a developing equipment 34, a transfer roller 35, a cleaning device 36, a fixing roller 37, a pressure roller 38, and a sheet discharge tray 39.

The sheet feed portion 4 includes a sheet feed cassette and a plurality of conveyance rollers, and supplies sheets stored in the sheet feed cassette, to the image forming portion 3 one by one. It is noted that the sheets stored in the sheet feed cassette are sheet-like materials such as sheets of paper, sheets of coated paper, postcards, envelopes, or OHP sheets.

In the image forming portion 3, an image is formed in the following procedure on a sheet supplied from the sheet feed portion 4, and the sheet with the image formed thereon is discharged to the sheet discharge tray 39.

First, the charging equipment 32 uniformly charges the surface of the photoconductor drum 31 to a certain potential. Next, the laser scanning portion 33 irradiates light on the surface of the photoconductor drum 31 based on the image data. This allows an electrostatic latent image corresponding to the image data to be formed on the surface of the photoconductor drum 31. The electrostatic latent image on the photoconductor drum 31 is developed (visualized) as a toner image by the developing equipment 34. It is noted that toner (developer) is replenished to the developing equipment 34 from a toner container 34A that is attached to the image forming portion 3 in a detachable manner.

Subsequently, the toner image formed on the photoconductor drum 31 is transferred to the sheet by the transfer roller 35. Thereafter, the sheet is passed through between the fixing roller 37 and the pressure roller 38, during which the sheet is heated by the fixing roller 37 so that the toner image transferred to the sheet is fused and fixed to the sheet. It is noted that toner that has remained on the surface of the photoconductor drum 31 is removed by the cleaning device 36.

The control portion 5 includes control equipment such as CPU, ROM, RAM, and EEPROM that are not shown. The CPU is a processor that executes various calculation processes. The ROM is a nonvolatile storage device in which various information such as control programs for causing the CPU to execute various processes are stored in advance. The RAM is a volatile storage device, and is used as a temporary storage memory (working area) for the various processes executed by the CPU. The EEPROM is a nonvolatile storage device. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion, wherein the display portion is, for example, a liquid crystal display and displays various types of information in response to control instructions from the control portion 5, and the operation portion is, for example, operation keys or a touch panel for inputting various types of information to the control portion 5 in response to user operations.

The storage portion 7 is a nonvolatile storage device such as a flash memory. It is noted that the storage portion 7 may be the ROM or the EEPROM of the control portion 5.

[Configuration of Laser Scanning Portion 33]

Figure 3:
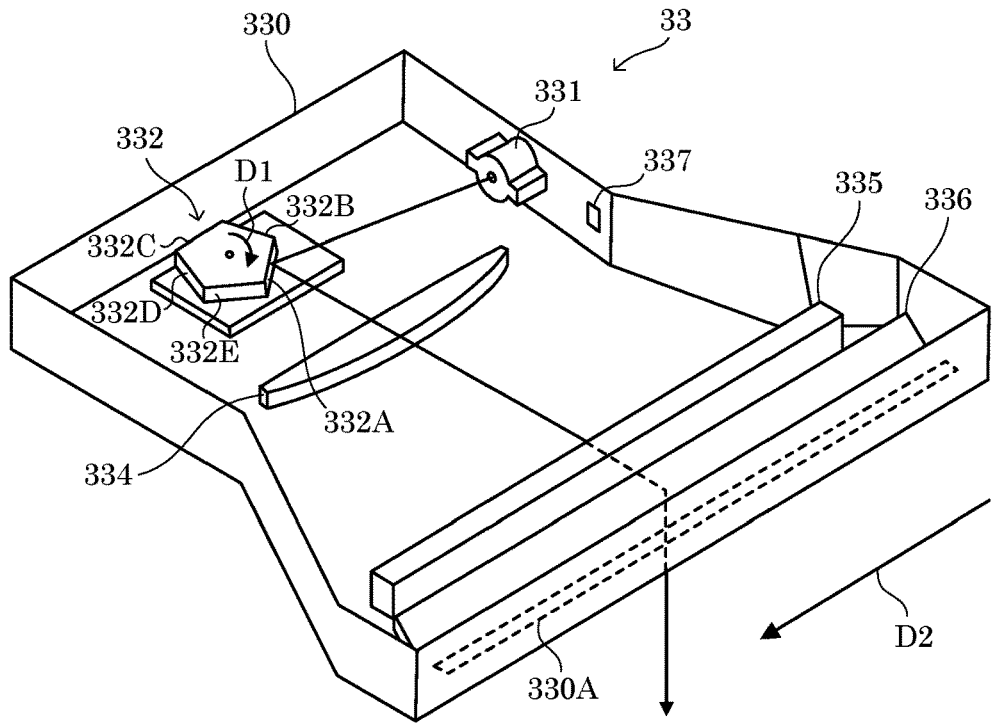
FIG. 3 is a diagram showing a configuration of a laser scanning portion of the image forming apparatus according to the first embodiment of the present invention.
Figure 4:
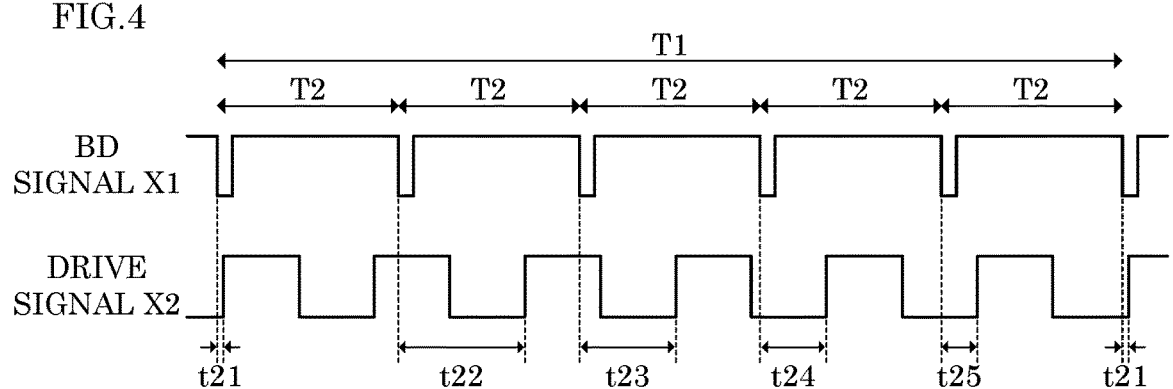
FIG. 4 is a timing chart showing a relationship between a timing at which a BD signal is input, and a timing at which a drive signal is output in the image forming apparatus according to the first embodiment of the present invention.

Next, the laser scanning portion 33 is described with reference to FIG. 2 to FIG. 5. Here, FIG. 3 is a perspective diagram showing a configuration of the laser scanning portion 33. In addition, FIG. 4 is a timing chart showing a relationship between: an input timing at which a light reception signal (hereinafter referred to as a "BD signal") X1 that has been output from a light detecting portion 337 is input to the control portion 5; and an output timing at which a drive signal X2 is output to a motor 333 from the control portion 5. In addition, FIG. 5 is a diagram showing a state where the input timing of the BD signal X1 and the output timing of the drive signal X2 is shifted due to environmental variations.

Figure 5:
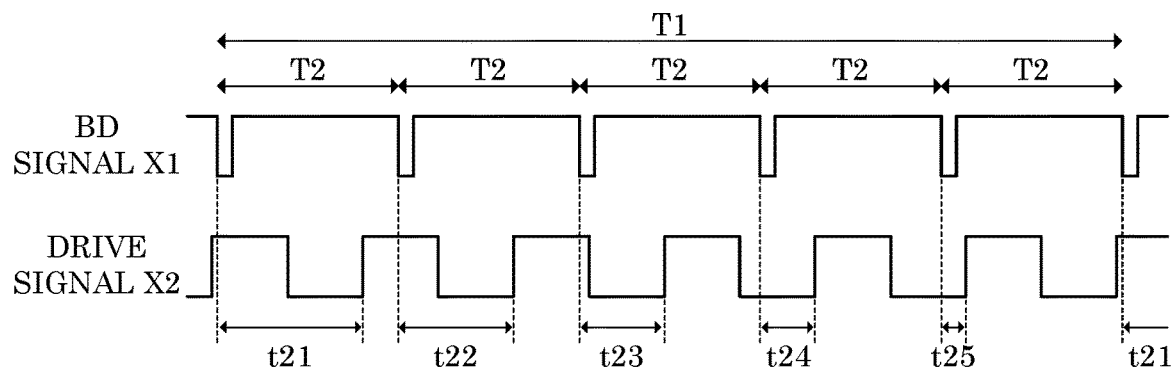
FIG. 5 is a timing chart showing a relationship between a timing at which the BD signal is input, and a timing at which the drive signal is output in the image forming apparatus according to the first embodiment of the present invention.

It is noted that in FIG. 4 and FIG. 5, the input timing of the BD signal X1 is indicated by a fall of an electric signal (voltage). In addition, in FIG. 4 and FIG. 5, the output timing of the drive signal X2 is indicated by a rise of an electric signal (voltage).

The laser scanning portion 33 forms, on the photoconductor drum 31, an electrostatic latent image corresponding to image data by scanning light over the photoconductor drum 31 in correspondence with the image data.

Specifically, as shown in FIG. 2 and FIG. 3, the laser scanning portion 33 includes a light source 331, a polygon mirror 332, the motor 333, an fθ lens 334, an fθ lens 335, a total reflection mirror 336, the light detecting portion 337, a housing 330 that stores these components, and a light-emitting port 330A formed in the housing 330. It is noted that in the image forming portion 3, the laser scanning portion 33 is disposed at a position above the photoconductor drum 31 where a longitudinal direction of the light-emitting port 330A and an axial direction of the photoconductor drum 31 are parallel to each other.

The light source 331 emits light in correspondence with image data. For example, the light source 331 is a laser diode.

The polygon mirror 332 is configured to scan light emitted from the light source 331 onto the photoconductor drum 31. For example, the polygon mirror 332 is regular pentagonal in a plan view as shown in FIG. 3, and includes reflection surfaces 332A to 332E that reflect light emitted from the light source 331.

The polygon mirror 332 rotates in a rotation direction D1 shown in FIG. 3 by a rotational driving force supplied from the drive motor 333. With this configuration, the light is scanned by the reflection surfaces 332A to 332E in sequence as the polygon mirror 332 rotates. Here, the polygon mirror 332 is an example of the rotary polygon mirror of the present invention.

The drive motor 333 causes the polygon mirror 332 to rotate by supplying the rotational driving force to the polygon mirror 332. Specifically, the drive motor 333 is a stepping motor. The drive motor 333 rotates at a speed that corresponds to a frequency of the drive signal X2 (see FIG. 4) that is input from the control portion 5.

The fθ lenses 334 and 335 convert light that is scanned by the polygon mirror 332 at a constant angular speed to light that is scanned at a constant speed along a scanning direction D2 (see FIG. 3). The total reflection mirror 336 reflects light that has passed through the fθ lens 335, toward the surface of the photoconductor drum 31. The light-emitting port 330A includes: an elongated opening through which the light reflected by the total reflection mirror 336 is emitted toward the surface of the photoconductor drum 31; and a transparent glass plate or acrylic plate closing the opening.

The light detecting portion 337 detects light scanned by the polygon mirror 332, at a predetermined detection position inside a scanning area in which the polygon mirror 332 scans the light. For example, the light detecting portion 337 is an optical sensor that includes a light receiving portion. For example, the detection position is located on the upstream side in the scanning direction D2, so as not to be reflected by the total reflection mirror 336. The light detecting portion 337 outputs the BD signal X1 (see FIG. 4), upon detecting light scanned by the polygon mirror 332.

The BD signal X1 output from the light detecting portion 337 is input to the control portion 5. Based on the input timing of the BD signal X1, the control portion 5 determines a timing for the light source 331 to emit light in correspondence with one line of the image data, namely, a timing to write an electrostatic latent image in the scanning direction D2.

Here, the drive motor 333 includes magnetic poles of a number that is mutually prime to and larger than the number of the reflection surfaces of the polygon mirror 332. As a result, in the image forming apparatus 10, as shown in FIG. 4, at least one drive signal X2 is output from the control portion 5 in each detection cycle T2 when light is detected by the light detecting portion 337 (each input cycle of the BD signal X1 to the control portion 5). In addition, in the image forming apparatus 10, as shown in FIG. 4, detection cycles T2 in a rotation cycle T1 of the polygon mirror 332 are different from each other in interval between a detection timing at which light is detected by the light detecting portion 337 (an input timing when the BD signal X1 is input to the control portion 5) and an output timing when the drive signal X2 is output to the drive motor 333 first after the detection timing.

Meanwhile, there is known a related technique configured to identify a reflection surface of the polygon mirror 332 based on the detection timing and the output timing of the drive signal X2. Specifically, an output of the drive signal X2 is monitored in each of predetermined division periods in a detection cycle T2, and a reflection surface of the polygon mirror is identified based on which of a certain division period that corresponds to a certain reflection surface, and division periods before and after the certain division period, the drive signal X2 was detected. This makes it possible to identify a reflection surface of the polygon mirror 332 even in a case where the interval between the detection timing and the output timing of the drive signal X2 has been shifted due to environmental variations.

However, according to the related technique, it is necessary to store, in a memory, results of monitoring the output of the drive signal X2 of at least three division periods, and it is necessary to update the monitoring result data stored in storage areas of the memory each time the division periods elapse. That is, the data stored in the storage areas of the memory is updated as many times as the number of the division periods in each detection cycle T2. This shortens the life of the memory of the image forming apparatus 10. On the other hand, as described in the following, according to the image forming apparatus 10 of the first embodiment of the present invention, it is possible to reduce the number of updates of the memory, and identify a reflection surface of the polygon mirror 332 while allowing the shift of the detection interval that is generated due to environmental variations.

Specifically, a first reflection surface identification program for causing the CPU to execute a first reference interval setting process (see the flowchart of FIG. 6) and a first reflection surface identification process (see the flowchart of FIG. 7) that are described below, is stored in advance in the ROM of the control portion 5. It is noted that the first reflection surface identification program may be recorded on a computer-readable recording medium such as a CD, a DVD, or a flash memory, and may be installed from the recording medium to a storage device, such as the EEPROM, of the control portion 5.

As shown in FIG. 2, the control portion 5 includes an acquisition processing portion 51, a setting processing portion 52, an allowable value setting portion 53, a measurement processing portion 54, an identification processing portion 55, and a correction processing portion 56. Specifically, the control portion 5 executes the first reflection surface identification program stored in the ROM by using the CPU. This allows the control portion 5 to function as the acquisition processing portion 51, the setting processing portion 52, the allowable value setting portion 53, the measurement processing portion 54, the identification processing portion 55, and the correction processing portion 56. Here, a device that includes the laser scanning portion 33 and the control portion 5 is an example of the laser scanning device of the present invention.

The acquisition processing portion 51 acquires an interval between the detection timing at which light is detected by the light detecting portion 337 and the output timing at which the drive signal X2 is output to the drive motor 333 first after the detection timing, in each of the detection cycles T2 that respectively correspond to the reflection surfaces 332A to 332E of the polygon mirror 332.

For example, the acquisition processing portion 51 causes the light source 331 to emit light and outputs the drive signal X2 to the drive motor 333 so as to rotate the drive motor 333 at a predetermined reference speed.

In addition, the acquisition processing portion 51 identifies the reflection surfaces 332A to 332E that correspond to the detection cycles T2. For example, in the image forming apparatus 10, when the polygon mirror 332 is assembled onto the laser scanning portion 33, the reflection surfaces 332A to 332E are respectively arranged at predetermined positions. With this configuration, at the first driving of the drive motor 333, the acquisition processing portion 51 can identify the reflection surfaces 332A to 332E corresponding to the detection cycles T2 by counting the number of clocks of the drive signal X2 that is input to the drive motor 333. It is noted that after the setting processing portion 52 sets the reference interval, the acquisition processing portion 51 causes the identification processing portion 55 to identify the reflection surfaces 332A to 332E that respectively correspond to the detection cycles T2.

The acquisition processing portion 51, in each of the detection cycles T2 that respectively correspond to the reflection surfaces 332A to 332E to be identified, acquires, by measuring, the interval between the detection timing at which light is detected by the light detecting portion 337 and the output timing at which the drive signal X2 is output to the drive motor 333 first after the detection timing.

The setting processing portion 52 sets one among a plurality of intervals, excluding the shortest interval and the longest interval, as a reference interval that is used to identify a reference reflection surface of the polygon mirror 332, wherein the plurality of intervals which are each an interval between the detection timing at which light is detected by the light detecting portion 337 and the output timing at which the drive signal X2 is output to the drive motor 333 first after the detection timing, are acquired by the acquisition processing portion 51 in the detection cycles T2 that respectively correspond to the reflection surfaces 332A to 332E of the polygon mirror 332.

For example, the setting processing portion 52 sets the reference interval by storing, in a predetermined storage area in the storage portion 7, one among the plurality of intervals excluding the shortest interval and the longest interval, the plurality of intervals being each an interval between the detection timing and the output timing at which the drive signal X2 is output to the drive motor 333 first after the detection timing, the plurality of intervals being acquired by the acquisition processing portion 51 in the detection cycles T2 that respectively correspond to the reflection surfaces 332A to 332E of the polygon mirror 332.

It is noted that in the image forming apparatus 10, the control portion 5 may not include the acquisition processing portion 51 and the setting processing portion 52. For example, a plurality of intervals which are each an interval between the detection timing and the output timing at which the drive signal X2 is output to the drive motor 333 first after the detection timing, may be measured by a manufacturing worker of the image forming apparatus 10 in advance by using a tool or the like in the detection cycles T2 that respectively correspond to the reflection surfaces 332A to 332E of the polygon mirror 332, and one of the measured intervals may be stored in a predetermined storage area in the storage portion 7.

The allowable value setting portion 53 acquires two intervals respectively in two successive detection cycles T2 and sets an allowable value based on a difference between the two intervals, wherein each of the two intervals is an interval between the detection timing at which light is detected by the light detecting portion 337 and the output timing at which the drive signal X2 is output to the drive motor 333 first after the detection timing, and the allowable value is used to identify the reference reflection surface of the polygon mirror 332.

For example, the allowable value setting portion 53 calculates a difference between two intervals acquired by the acquisition processing portion 51 in two successive detection cycles T2, the two intervals being each an interval between the detection timing and the output timing at which the drive signal X2 is output to the drive motor 333 first after the detection timing. The allowable value setting portion 53 then calculates the allowable value by subtracting a predetermined correction value from the calculated difference, and sets the allowable value by storing the calculated allowable value in a predetermined storage area in the storage portion 7.

For example, the correction value is a quantization error in the sampling, an amount of variation of the interval between the detection timing and the output timing of the drive signal X2 that is caused by a temperature change, or an amount of variation of the interval between the detection timing and the output timing of the drive signal X2 that is caused by a temporal change.

It is noted that in the image forming apparatus 10, the control portion 5 may not include the allowable value setting portion 53. For example, a predetermined allowable value may be stored in advance in a predetermined storage area in the storage portion 7.

The measurement processing portion 54 measures, in each of the detection cycles T2 in which light is detected by the light detecting portion 337, an interval between the detection timing at which light is detected by the light detecting portion 337 and the output timing at which the drive signal X2 that is to be input to the drive motor 333 first after the detection timing, is output.

For example, each time a predetermined timing comes, the measurement processing portion 54 causes the light source 331 to emit light and causes the drive motor 333 to rotate at the reference speed by inputting the drive signal X2 to the drive motor 333. The measurement processing portion 54 then measures, in each of the detection cycles T2, the interval between the detection timing and the output timing at which the drive signal X2 is output to the drive motor 333 first after the detection timing. It is noted that the predetermined timing is, for example, when the image forming apparatus 10 is powered on, when the image forming apparatus 10 returns to a normal state from a sleep state where some functions of the image forming apparatus 10 stop, and when the printing process is executed.

The identification processing portion 55 identifies the reference reflection surface that corresponds to the reference interval based on the reference interval and a measured interval measured by the measurement processing portion 54.

For example, in a case where the absolute value of a difference between the measured interval and the reference interval is smaller than the allowable value set by the allowable value setting portion 53, the identification processing portion 55 identifies, as the reference reflection surface, a reflection surface that reflects light emitted from the light source 331 in a detection cycle T2 that corresponds to the measured interval.

It is noted that, in a case where the measured interval is smaller than a total of the reference interval and a predetermined first allowable value, and exceeds a value that is obtained by subtracting a second allowable value that is different from the first allowable value, from the reference interval, the identification processing portion 55 may determine, as the reflection surface corresponding to the reference interval, a reflection surface that reflects light emitted from the light source 331 in a detection cycle T2 that corresponds to the measured interval.

The correction processing portion 56 corrects the width of one pixel of the electrostatic latent image formed on the photoconductor drum 31 by the reflection surfaces 332A to 332E, based on the identification result of the identification processing portion 55 and irradiation times that respectively correspond to the reflection surfaces 332A to 332E of the polygon mirror 332, the irradiation times being each a time period for which light is irradiated on the photoconductor drum 31.

For example, in the image forming apparatus 10, the irradiation times respectively corresponding to the reflection surfaces 332A to 332E are stored in advance in the storage portion 7. For example, the irradiation times respectively corresponding to the reflection surfaces 332A to 332E are measured by a manufacturing worker of the image forming apparatus 10 in advance by using a tool or the like, and stored in a predetermined storage area in the storage portion 7. For example, the correction processing portion 56 corrects the width of one pixel of the electrostatic latent image formed on the photoconductor drum 31 by the reflection surfaces 332A to 332E, by correcting lines of the image data that respectively correspond to the reflection surfaces 332A to 332E, based on the irradiation times read from the storage portion 7, the irradiation times respectively corresponding to the reflection surfaces 332A to 332E.

[First Reference Interval Setting Process]

Figure 6:
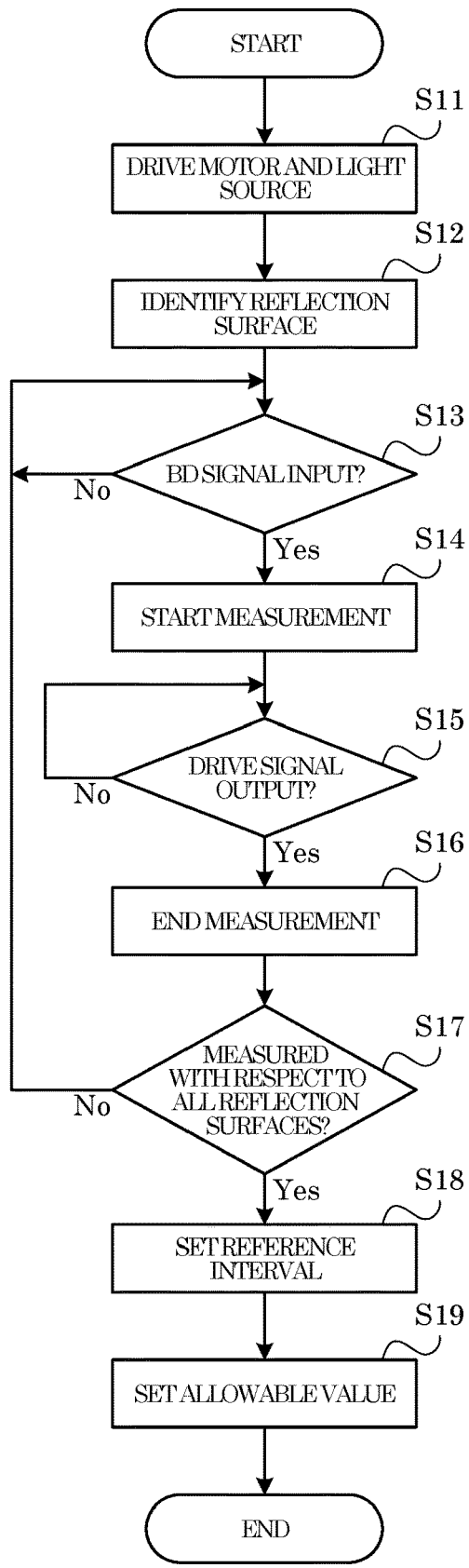
FIG. 6 is a flowchart showing an example of a first reference interval setting process executed in the image forming apparatus according to the first embodiment of the present invention.

In the following, with reference to FIG. 6, a description is given of an example of the procedure of the first reference interval setting process executed by the control portion 5 in the image forming apparatus 10. Here, steps S11, S12, . . . represent numbers assigned to the processing procedures (steps) executed by the control portion 5. It is noted that the first reference interval setting process is executed in response to a user operation performed on the operation/display portion 6. For example, the first reference interval setting process is executed in response to an operation performed on the operation/display portion 6 by a manufacturing worker of the image forming apparatus 10 before the shipment of the image forming apparatus 10. It is noted that the first reference interval setting process may be executed in response to an operation performed on the operation/display portion 6 by a maintenance worker of the image forming apparatus 10 after the shipment of the image forming apparatus 10.

<Step S11>

First, in step S11, the control portion 5 causes the light source 331 to emit light and inputs the drive signal X2 to the drive motor 333 so as to rotate the drive motor 333 at the reference speed.

<Step S12>

In step S12, the control portion 5 identifies a reflection surface of the polygon mirror 332 that reflects the light emitted from the light source 331. For example, the control portion 5 identifies a reflection surface of the polygon mirror 332 that reflects the light emitted from the light source 331, by counting the number of clocks of the drive signal X2 that is input to the drive motor 333.

It is noted that in a case where the reference interval is stored in the storage portion 7, the control portion 5 identifies a reflection surface of the polygon mirror 332 that reflects light emitted from the light source 331, by executing the processes of steps S23 to S28 of the first reflection surface identification process that is described below.

<Step S13>

In step S13, the control portion 5 determines whether or not the BD signal X1 has been input from the light detecting portion 337.

Here, upon determining that the BD signal X1 has been input from the light detecting portion 337 (Yes side at S13), the control portion 5 moves the process to step S14. In addition, upon determining that the BD signal X1 has not been input from the light detecting portion 337 (No side at S13), the control portion 5 waits at step S13 for the BD signal X1 to be input from the light detecting portion 337.

<Step S14>

In step S14, the control portion 5, in a detection cycle T2 that corresponds to the reflection surface identified in step S12, starts measuring an interval between the detection timing at which light was detected by the light detecting portion 337 (when the BD signal X1 was input in step S13) and the output timing at which the drive signal X2 was output to the drive motor 333 first after the detection timing.

<Step S15>

In step S15, the control portion 5 determines whether or not the drive signal X2 has been output.

Here, upon determining that the drive signal X2 has been output (Yes side at S15), the control portion 5 moves the process to step S16. In addition, upon determining that the drive signal X2 has not been output (No side at S15), the control portion 5 waits at step S15 for the drive signal X2 to be output.

<Step S16>

In step S16, the control portion 5 ends the measurement that was started in step S14.

<Step S17>

In step S17, the control portion 5 determines whether or not the interval between the detection timing and the output timing at which the drive signal X2 is output to the drive motor 333 first after the detection timing, has been measured with respect to all the reflection surfaces of the polygon mirror 332.

Here, upon determining that the interval has been measured with respect to all the reflection surfaces of the polygon mirror 332 (Yes side at S17), the control portion 5 moves the process to step S18. In addition, upon determining that the interval has not been measured with respect to all the reflection surfaces of the polygon mirror 332 (No side at S17), the control portion 5 moves the process to step S13, and executes the processes of steps S13 to S16. Here, the processes of steps S11 to S17 are executed by the acquisition processing portion 51 of the control portion 5.

<Step S18>

In step S18, the control portion 5 sets the reference interval. Here, the process of step S18 is executed by the setting processing portion 52 of the control portion 5.

Specifically, the control portion 5 sets the reference interval by storing, in a predetermined storage area in the storage portion 7, one among the plurality of intervals excluding the shortest interval and the longest interval, the plurality of intervals being each an interval between the detection timing at which light is detected by the light detecting portion 337 and the output timing at which the drive signal X2 is output to the drive motor 333 first after the detection timing, the plurality of intervals being acquired in the detection cycles T2 that respectively correspond to the reflection surfaces 332A to 332E of the polygon mirror 332 in the processes of steps S11 to S17.

For example, in a case where intervals t21 to t25 shown in FIG. 4 were acquired in the processes of steps S11 to S17, the control portion 5 sets one of the intervals t23, t24 and t25 as the reference interval, excluding the shortest interval t21 and the longest interval t22. This makes it possible to avoid becoming incapable of identifying a reflection surface, even when the interval between the BD signal X1 input timing and the drive signal X2 output timing is shifted from the state shown in FIG. 4 to the state shown in FIG. 5 due to environmental variations.

For example, if the interval t21 shown in FIG. 4 is set as the reference interval, and the interval between the BD signal X1 input timing and the drive signal X2 output timing is shifted as shown in FIG. 5 due to environmental variations, the interval t21 varies in excess of the allowable value, and it becomes incapable of identifying a reflection surface.

Furthermore, in a case where intervals t21 to t25 shown in FIG. 5 were acquired in the processes of steps S11 to S17, the control portion 5 sets one of the intervals t22, t23 and t24 as the reference interval, excluding the shortest interval t25 and the longest interval t21. This makes it possible to avoid becoming incapable of identifying a reflection surface, even when the interval between the BD signal X1 input timing and the drive signal X2 output timing is shifted from the state shown in FIG. 5 to the state shown in FIG. 4 due to environmental variations.

For example, if the interval t21 shown in FIG. 5 is set as the reference interval, and the interval between the BD signal X1 input timing and the drive signal X2 output timing is shifted as shown in FIG. 4 due to environmental variations, the interval t21 varies in excess of the allowable value, and it becomes incapable of identifying a reflection surface.

Accordingly, in the image forming apparatus 10, it is possible, different from the related technique, to avoid becoming incapable of identifying a reflection surface without storing, in a memory, results of monitoring the output of the drive signal X2 of at least three division periods, and without updating the monitoring result data stored in storage areas of the memory each time the division periods elapse.

<Step S19>

In step S19, the control portion 5 sets the allowable value. Here, the process of step S19 is executed by the allowable value setting portion 53 of the control portion 5.

For example, the control portion 5 calculates a difference between two intervals acquired in two successive detection cycles T2 in the processes of steps S11 to S17, the two intervals being each an interval between the detection timing at which light is detected by the light detecting portion 337 and the output timing at which the drive signal X2 is output to the drive motor 333 first after the detection timing. The control portion 5 then calculates the allowable value by subtracting the correction value from the calculated difference, and sets the allowable value by storing the calculated allowable value in a predetermined storage area in the storage portion 7.

It is noted that the process of step S19 may be executed each time the first reflection surface identification process that is described below, is executed. For example, the control portion 5 may store, in the storage portion 7, a difference between two intervals acquired in two successive detection cycles T2 in the processes of steps S11 to S17, the two intervals being each an interval between the detection timing and the output timing at which the drive signal X2 is output to the drive motor 333 first after the detection timing.

Subsequently, each time the first reflection surface identification process is executed, the control portion 5 may acquire, from the ROM or the like, a correction value corresponding to, for example, the temperature at that time and the number of sheets to be printed, and set the allowable value based on the acquired correction value and the difference between the two intervals acquired in the two successive detection cycles T2, that has been stored in the storage portion 7.

In addition, in the image forming apparatus 10, the first reference interval setting process may not be executed.

[First Reflection Surface Identification Process]

Figure 7:
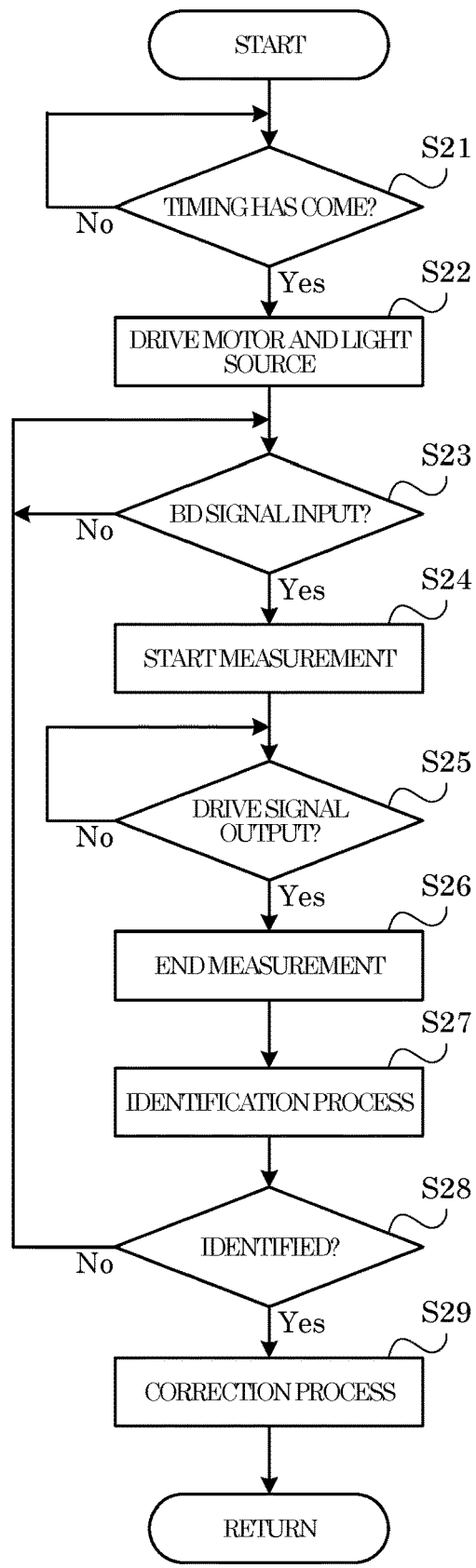
FIG. 7 is a flowchart showing an example of a first reflection surface identification process executed in the image forming apparatus according to the first embodiment of the present invention.

Next, with reference to FIG. 7, a description is given of an example of the procedure of the first reflection surface identification process executed by the control portion 5 in the image forming apparatus 10 according to the first embodiment.

<Step S21>

First, in step S21, the control portion 5 determines whether or not the predetermined timing has come.

Here, upon determining that the predetermined timing has come (Yes side at S21), the control portion 5 moves the process to step S22. In addition, upon determining that the predetermined timing has not come (No side at S21), the control portion 5 waits at step S21 for the predetermined timing to come.

<Step S22>

In step S22, as in step S11 of the first reference interval setting process, the control portion 5 causes the light source 331 to emit light and inputs the drive signal X2 to the drive motor 333 so as to rotate the drive motor 333 at the reference speed.

<Step S23>

In step S23, the control portion 5 determines whether or not the BD signal X1 has been input from the light detecting portion 337.

Here, upon determining that the BD signal X1 has been input from the light detecting portion 337 (Yes side at S23), the control portion 5 moves the process to step S24. In addition, upon determining that the BD signal X1 has not been input from the light detecting portion 337 (No side at S23), the control portion 5 waits at step S23 for the BD signal X1 to be input from the light detecting portion 337.

<Step S24>

In step S24, the control portion 5 starts measuring an interval between the detection timing at which light was detected by the light detecting portion 337 (when the BD signal X1 was input in step S23) and the output timing at which the drive signal X2 was output to the drive motor 333 first after the detection timing.

<Step S25>

In step S25, the control portion 5 determines whether or not the drive signal X2 has been output.

Here, upon determining that the drive signal X2 has been output (Yes side at S25), the control portion 5 moves the process to step S26. In addition, upon determining that the drive signal X2 has not been output (No side at S25), the control portion 5 waits at step S25 for the drive signal X2 to be output.

<Step S26>

In step S26, the control portion 5 ends the measurement that was started in step S24. Here, the processes of steps S21 to S26 are executed by the measurement processing portion 54 of the control portion 5.

<Step S27>

In step S27, the control portion 5 identifies a reference reflection surface that corresponds to the reference interval based on the predetermined reference interval and a measured interval measured in the process of step S26. Here, the process of step S27 is executed by the identification processing portion 55 of the control portion 5.

Specifically, in a case where the absolute value of a difference between the measured interval and the reference interval is smaller than the allowable value, the control portion 5 determines that a reflection surface that reflects light emitted from the light source 331 in a detection cycle T2 that corresponds to the measured interval, is the reference reflection surface.

<Step S28>

In step S28, the control portion 5 determines whether or not the reference reflection surface corresponding to the reference interval has been identified in step S27.

Here, upon determining that the reference reflection surface has been identified in step S27 (Yes side at S28), the control portion 5 moves the process to step S29. In addition, upon determining that the reference reflection surface has not been identified in step S27 (No side at S28), the control portion 5 moves the process to step S23. The control portion 5 executes the processes of steps S23 to S27 until the reference reflection surface is identified in step S27.

<Step S29>

In step S29, the control portion 5 corrects the width of one pixel of the electrostatic latent image formed on the photoconductor drum 31 by the reflection surfaces 332A to 332E, based on the identification result in step S27 and the irradiation times that respectively correspond to the reflection surfaces 332A to 332E of the polygon mirror 332. Here, the process of step S29 is executed by the correction processing portion 56 of the control portion 5.

For example, the control portion 5 corrects the width of one pixel of the electrostatic latent image formed on the photoconductor drum 31 by the reflection surfaces 332A to 332E, by correcting lines of the image data that respectively correspond to the reflection surfaces 332A to 332E, based on the irradiation times read from the storage portion 7, the irradiation times respectively corresponding to the reflection surfaces 332A to 332E. This corrects variations in the degree of unit magnification in the main scanning direction in the print image that are caused by, for example, a surface tilt of the reflection surfaces 332A to 332E of the polygon mirror 332.

As described above, in the image forming apparatus 10 according to the first embodiment of the present invention, a reflection surface of the polygon mirror 332 is identified based on the predetermined reference interval. In addition, in the image forming apparatus 10, the reference interval is set as one of a plurality of intervals excluding the shortest interval and the longest interval, the plurality of intervals being each an interval between the detection timing at which light is detected by the light detecting portion 337 and the output timing at which the drive signal X2 is output to the drive motor 333 first after the detection timing, the plurality of intervals being acquired in the detection cycles T2 that respectively correspond to the reflection surfaces 332A to 332E of the polygon mirror 332. This makes it possible to reduce the number of times that the memory is updated, and identify a reflection surface of the polygon mirror 332 while allowing the shift of the detection interval that is generated due to environmental variations.

Meanwhile, when the rotation speed of the drive motor 333 is changed, the interval between the light detection timing at which light is detected by the light detecting portion 337 and the drive signal X2 output timing that is measured in each of the detection cycles T2 in which light is detected by the light detecting portion 337, may not regularly change in correspondence with the change of the rotation speed of the drive motor 333. Accordingly, in the image forming apparatus 10, in a case where a reflection surface of the polygon mirror 332 is identified based on the reference interval corresponding to a specific rotation speed, a change of the rotation speed of the drive motor 333 may decrease the accuracy of identifying a reflection surface of the polygon mirror 332.

In addition, when the rotation speed of the drive motor 333 is changed, the irradiation times in the detection cycles T2 that respectively correspond to the reflection surfaces 332A to 332E may not regularly change in correspondence with the change of the rotation speed of the drive motor 333 as is the case with the interval between the light detection timing at which light is detected by the light detecting portion 337 and the drive signal X2 output timing. As a result, in the image forming apparatus 10, in a case where the width of one pixel of the electrostatic latent image formed on the photoconductor drum 31 by the reflection surfaces 332A to 332E is corrected based on the irradiation times of the reflection surfaces 332A to 332E corresponding to a specific rotation speed, a change of the rotation speed of the drive motor 333 may decrease the accuracy of the correction.

Second Embodiment

Figure 8:
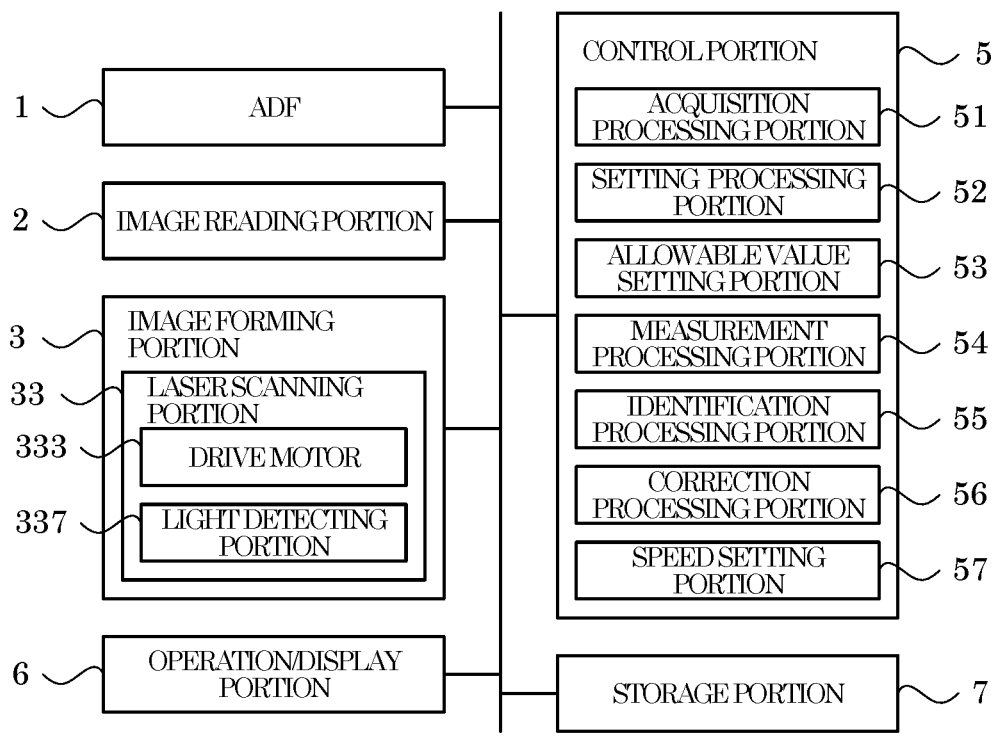
FIG. 8 is a block diagram showing a system configuration of an image forming apparatus according to a second embodiment of the present invention.
Figure 9:
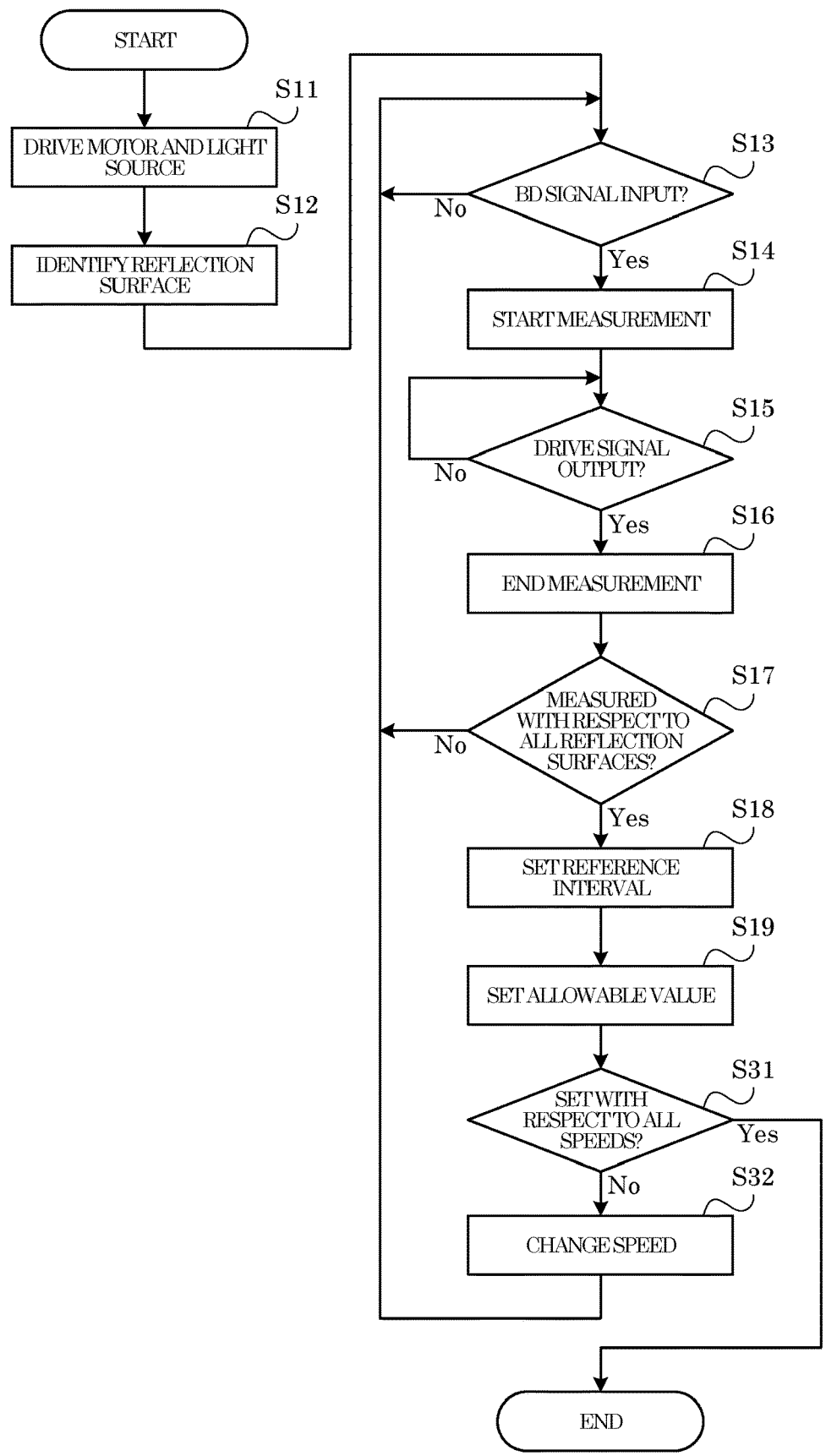
FIG. 9 is a flowchart showing an example of a second reference interval setting process executed in the image forming apparatus according to the second embodiment of the present invention.
Figure 10:
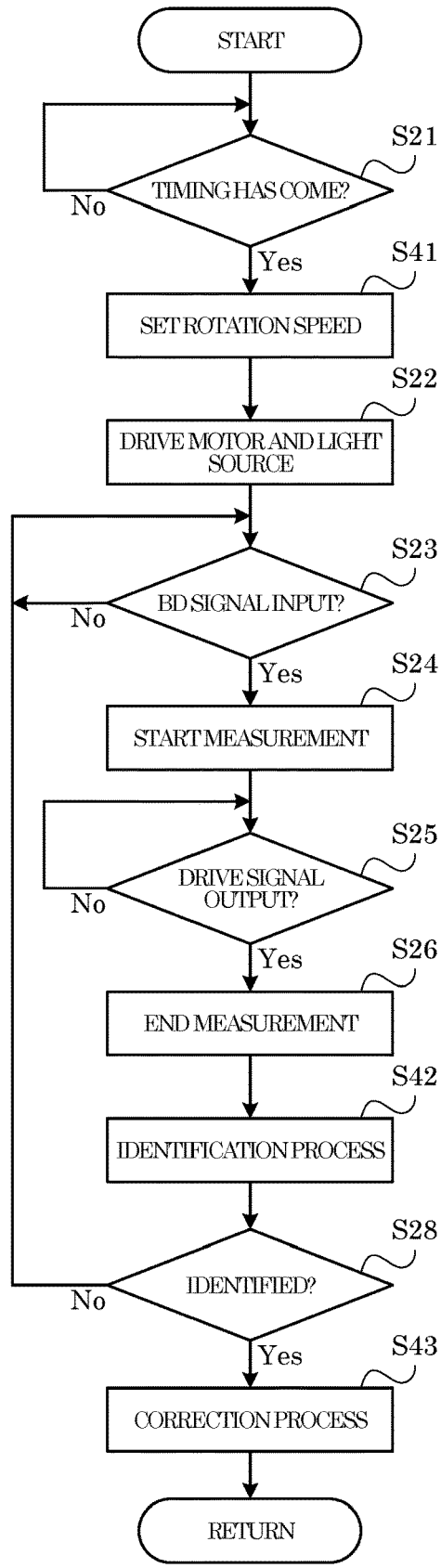
FIG. 10 is a flowchart showing an example of a second reflection surface identification process executed in the image forming apparatus according to the second embodiment of the present invention.

The following describes an image forming apparatus 10 according to a second embodiment, with reference to FIG. 8 to FIG. 10. The image forming apparatus 10 according to the second embodiment differs from that according to the first embodiment in the configuration of the control portion 5.

Specifically, a second reflection surface identification program for causing the CPU to execute a second reference interval setting process (see the flowchart of FIG. 9) and a second reflection surface identification process (see the flowchart of FIG. 10) that are described below, is stored in advance in the ROM of the control portion 5.

As shown in FIG. 8, the control portion 5 includes a speed setting portion 57, as well as the acquisition processing portion 51, the setting processing portion 52, the allowable value setting portion 53, the measurement processing portion 54, the identification processing portion 55, and the correction processing portion 56. Specifically, the control portion 5 executes the second reflection surface identification program stored in the ROM by using the CPU. This allows the control portion 5 to function as the acquisition processing portion 51, the setting processing portion 52, the allowable value setting portion 53, the measurement processing portion 54, the identification processing portion 55, the correction processing portion 56, and the speed setting portion 57.

The speed setting portion 57 is configured to set the rotation speed of the drive motor 333 to one of a plurality of predetermined specific speeds.

For example, in the image forming apparatus 10, the printing process is executed in a print mode that is selected in accordance with a user operation or an instruction from an external information processing apparatus, from a plurality of print modes to which different resolutions or print speeds are assigned. Specifically, in the image forming apparatus 10, a sheet conveyance speed, a rotation speed of the photoconductor drum 31, a rotation speed (the specific speed) of the drive motor 333 and the like are set for each of the print modes. That is, the specific speeds respectively correspond to resolutions or print speeds for image formation from which a selection can be made in the image forming apparatus 10. When the timing comes, the speed setting portion 57 sets the rotation speed of the drive motor 333 to a specific speed corresponding to a print mode at the time when the timing comes. It is noted that the plurality of specific speeds include the reference speed.

Here, the acquisition processing portion 51 acquires, for each of the specific speeds, intervals that respectively correspond to the reflection surfaces 332A to 332E of the polygon mirror 332, the intervals each being the interval between the detection timing at which light is detected by the light detecting portion 337 and the output timing at which the drive signal X2 is output to the drive motor 333 first after the detection timing.

The setting processing portion 52 sets a reference interval for each of the specific speeds based on the intervals acquired for each of the specific speeds by the acquisition processing portion 51, the intervals respectively corresponding to the reflection surfaces 332A to 332E of the polygon mirror 332, and each being the interval between the detection timing at which light is detected by the light detecting portion 337 and the output timing at which the drive signal X2 is output to the drive motor 333 first after the detection timing.

For each of the specific speeds, the allowable value setting portion 53 obtains two intervals respectively in two consecutive detection cycles T2, and sets the allowable value based on a difference between the obtained two intervals, wherein the two intervals is each an interval between the detection timing at which light is detected by the light detecting portion 337 and the output timing at which the drive signal X2 is output to the drive motor 333 first after the detection timing.

The identification processing portion 55 identifies the reference reflection surface based on an interval measured by the measurement processing portion 54, and a reference interval that, among the reference intervals that have been set in advance for each of the specific speeds, corresponds to a rotation speed of the drive motor 333 at the time when the interval was measured by the measurement processing portion 54.

Specifically, the reference intervals corresponding to each of the specific speeds are stored in the storage portion 7. For example, the reference intervals corresponding to each of the specific speeds are stored in a predetermined storage area in the storage portion 7 when the second reference interval setting process that is described below, is executed. The identification processing portion 55 acquires, from the storage portion 7, a reference interval that corresponds to a rotation speed of the drive motor 333 at the time when the interval was measured by the measurement processing portion 54. It is noted that the reference intervals corresponding to each of the specific speeds may be measured by a manufacturing worker of the image forming apparatus 10 in advance by using a tool or the like and stored in the storage portion 7.

It is noted that in the image forming apparatus 10 according to the second embodiment, the reference reflection surface may be a reflection surface corresponding to the shortest interval or the longest interval among the intervals that respectively correspond to the reflection surfaces 332A to 332E of the polygon mirror 332, and are each an interval between the detection timing at which light is detected by the light detecting portion 337 and the output timing at which the drive signal X2 is output to the drive motor 333 first after the detection timing.

The correction processing portion 56 corrects the width of one pixel of the electrostatic latent image formed on the photoconductor drum 31 by the reflection surfaces 332A to 332E, based on the identification result of the identification processing portion 55 and the irradiation times of the reflection surfaces 332A to 332E that correspond to the rotation speed of the drive motor 333 at the time when the measured interval was measured by the measurement processing portion 54, among the irradiation times that have been set in advance for each of the specific speeds, the irradiation times being each a time for which light is irradiated on the photoconductor drum 31 and respectively corresponding to the reflection surfaces 332A to 332E of the polygon mirror 332.

Specifically, the irradiation times of the reflection surfaces 332A to 332E that correspond to each of the specific speeds are stored in the storage portion 7. For example, the irradiation times of the reflection surfaces 332A to 332E that correspond to each of the specific speeds are measured by a manufacturing worker of the image forming apparatus 10 in advance by using a tool or the like and are stored in predetermined storage area in the storage portion 7. The correction processing portion 56 acquires, from the storage portion 7, the irradiation times of the reflection surfaces 332A to 332E that correspond to the rotation speed of the drive motor 333 at the time when the measured interval was measured by the measurement processing portion 54.

[Second Reference Interval Setting Process]

In the following, with reference to FIG. 9, a description is given of an example of the procedure of the second reference interval setting process executed by the control portion 5 in the image forming apparatus 10 according to the second embodiment. It is noted that among the steps included in the second reference interval setting process, steps common to the first reference interval setting process are indicated by the same reference signs, and description thereof is omitted.

<Step S31>

In step S31, the control portion 5 determines whether or not the reference interval and the allowable value have been set with respect to all of the specific speeds.

Here, upon determining that the reference interval and the allowable value have been set with respect to all of the specific speeds (Yes side at S31), the control portion 5 ends the second reference interval setting process. In addition, upon determining that the reference interval and the allowable value have not been set with respect to all of the specific speeds (No side at S31), the control portion 5 moves the process to step S32.

<Step S32>

In step S32, the control portion 5 rotates the drive motor 333 at, among the plurality of specific speeds, a specific speed for which the reference interval and the allowable value have not been set.

It is noted that in the image forming apparatus 10, the second reference interval setting process may not be executed. In this case, the reference interval and the allowable value for each of the specific speeds may be stored in the storage portion 7 in advance.

[Second Reflection Surface Identification Process]

Next, with reference to FIG. 10, a description is given of an example of the procedure of the second reflection surface identification process executed by the control portion 5 in the image forming apparatus 10 according to the second embodiment. It is noted that among the steps included in the second reflection surface identification process, steps common to the first reflection surface identification process are indicated by the same reference signs, and description thereof is omitted. Here, the processes of steps S23 to S26 in the second reflection surface identification process are an example of the measuring step of the present invention, and are executed by the measurement processing portion 54 of the control portion 5.

<Step S41>

In step S41, the control portion 5 sets a rotation speed of the drive motor 333 to a specific speed corresponding to the current print mode. Here, the process of step S41 is an example of the setting step of the present invention, and is executed by the speed setting portion 57 of the control portion 5. It is noted that in step S22 following step S41, the drive motor 333 is rotated at the specific speed that is set in step S41.

<Step S42>

In step S42, the control portion 5 identifies the reference reflection surface based on the measured interval measured in step S26, and the reference interval corresponding to the specific speed set in step S41. Here, the process of step S42 is an example of the identifying step of the present invention, and is executed by the identification processing portion 55 of the control portion 5.

Specifically, the control portion 5 acquires a reference interval corresponding to the specific speed set in step S41 from the storage portion 7. When the absolute value of a difference between the measured interval and the reference interval is smaller than the allowable value, the control portion 5 determines that a reflection surface that reflects light emitted from the light source 331 in a detection cycle T2 that corresponds to the measured interval, is the reference reflection surface.

<Step S43>

In step S43, the control portion 5 corrects the width of one pixel of the electrostatic latent image formed on the photoconductor drum 31 by the reflection surfaces 332A to 332E, based on the identification result in step S42, and the irradiation times of the reflection surfaces 332A to 332E of the polygon mirror 332 that correspond to the specific speed set in step S41.

Specifically, the control portion 5 acquires, from the storage portion 7, the irradiation times of the reflection surfaces 332A to 332E that correspond to the specific speed set in step S41. The control portion 5 then corrects the width of one pixel of the electrostatic latent image formed on the photoconductor drum 31 by the reflection surfaces 332A to 332E, by correcting lines of image data that respectively correspond to the reflection surfaces 332A to 332E, based on the irradiation times of the reflection surfaces 332A to 332E read from the storage portion 7.

As described above, in the image forming apparatus 10 according to the second embodiment of the present invention, a reflection surface of the polygon mirror 332 is identified based on the reference interval which has been set for each of the specific speeds. With this configuration, it is possible to prevent the accuracy of identifying a reflection surface of the polygon mirror 332 from decreasing in response to a change of the rotation speed of the drive motor 333.

In addition, in the image forming apparatus 10 according to the second embodiment of the present invention, the width of one pixel of the electrostatic latent image formed on the photoconductor drum 31 by the reflection surfaces 332A to 332E is corrected based on irradiation times that respectively correspond to the reflection surfaces 332A to 332E, wherein the irradiation times have been measured in advance for each of the specific speeds. With this configuration, it is possible to prevent the accuracy of correcting the width of one pixel of the electrostatic latent image formed on the photoconductor drum 31 by the reflection surfaces 332A to 332E, from decreasing in response to a change of the rotation speed of the drive motor 333.

The invention claimed is:

1. A laser scanning device comprising:
   a light source;
   a rotary polygon mirror having a plurality of reflection surfaces that reflect light emitted from the light source, and configured to rotate such that the light is scanned by the plurality of reflection surfaces in sequence;
   a drive motor having magnetic poles of a number that is mutually prime to and larger than a number of the plurality of reflection surfaces, and configured to cause the rotary polygon mirror to rotate;
   a light detecting portion configured to detect the light scanned by the rotary polygon mirror, at a predetermined detection position inside a scanning area in which the rotary polygon mirror scans the light;
   a speed setting portion configured to set a rotation speed of the drive motor to one of a plurality of predetermined specific speeds;
   a measurement processing portion configured to, in each of a plurality of detection cycles in which the light is detected by the light detecting portion, measure, as a measured interval, an interval between a detection timing at which the light is detected by the light detecting portion and an output timing at which a drive signal that is to be input to the drive motor first after the detection timing, is output; and
   an identification processing portion configured to identify a predetermined reference reflection surface among the plurality of reflection surfaces, based on the measured interval measured by the measurement processing portion and a reference interval that corresponds to a rotation speed of the drive motor at a time when the measured interval was measured by the measurement processing portion, the reference interval being among a plurality of reference intervals that have preliminarily been set in correspondence with the plurality of predetermined specific speeds and are each an interval between the detection timing and the output timing.

2. The laser scanning device according to claim 1, further comprising:
   a correction processing portion configured to correct a width of one pixel of an electrostatic latent image formed on an image carrier by the plurality of reflection surfaces, based on an identification result of the identification processing portion and, among irradiation times that respectively correspond to the plurality of reflection surfaces, that have been set in advance for each of the plurality of specific speeds, and that are each a time period for which light is irradiated on the image carrier, irradiation times of the plurality of reflection surfaces that correspond to the rotation speed of the drive motor at the time when the measured interval was measured by the measurement processing portion.

3. The laser scanning device according to claim 2, further comprising:
   a storage portion storing the reference intervals corresponding to each of the plurality of specific speeds, and the irradiation times of the plurality of reflection surfaces that correspond to each of the plurality of specific speeds, wherein
   the identification processing portion acquires, from the storage portion, the reference interval that corresponds to the rotation speed of the drive motor at the time when the measured interval was measured by the measurement processing portion, and
   the correction processing portion acquires, from the storage portion, the irradiation times of the plurality of reflection surfaces that correspond to the rotation speed of the drive motor at the time when the measured interval was measured by the measurement processing portion.

4. The laser scanning device according to claim 1, wherein
   the plurality of specific speeds respectively correspond to resolutions or print speeds for image formation from which a selection can be made in an image forming apparatus in which the laser scanning device is mounted.

5. The laser scanning device according to claim 1, wherein
   the reference reflection surface is one of the plurality of reflection surfaces that corresponds to one among intervals, excluding a shortest interval and a longest interval, that respectively correspond to the plurality of reflection surfaces and are each an interval between the detection timing and the output timing.

6. The laser scanning device according to claim 1, wherein
   in a case where an absolute value of a difference between the measured interval and the reference interval is smaller than a predetermined allowable value, the identification processing portion determines that a reflection surface that reflects light emitted from the light source in a detection cycle that corresponds to the measured interval, is the reference reflection surface.

7. The laser scanning device according to claim 6, further comprising:
   an allowable value setting portion configured to set the allowable value for each of the plurality of specific speeds based on a difference between two intervals that are respectively acquired in two successive detection cycles, wherein each of the two intervals is an interval between the detection timing and the output timing.

8. The laser scanning device according to claim 1, further comprising:
   an acquisition processing portion configured to acquire, for each of the plurality of specific speeds, intervals that respectively correspond to the plurality of reflection surfaces and are each an interval between the detection timing and the output timing; and
   a setting processing portion configured to set the reference interval for each of the plurality of specific speeds, based on the intervals acquired by the acquisition processing portion that respectively correspond to the plurality of reflection surfaces and are each an interval between the detection timing and the output timing.

9. An image forming apparatus comprising the laser scanning device according to claim 1.

10. A reflection surface identification method executed in a laser scanning device which includes a light source, a rotary polygon mirror having a plurality of reflection surfaces that reflect light emitted from the light source and configured to rotate such that the light is scanned by the plurality of reflection surfaces in sequence, a drive motor having magnetic poles of a number that is mutually prime to and larger than a number of the plurality of reflection surfaces and configured to cause the rotary polygon mirror to rotate, and a light detecting portion configured to detect the light scanned by the rotary polygon mirror, at a predetermined detection position inside a scanning area in which the rotary polygon mirror scans the light, the reflection surface identification method comprising:

- a setting step of setting a rotation speed of the drive motor to one of a plurality of predetermined specific speeds;
- a measuring step of, in each of a plurality of detection cycles in which the light is detected by the light detecting portion, measuring, as a measured interval, an interval between a detection timing at which the light is detected by the light detecting portion and an output timing at which a drive signal that is to be input to the drive motor first after the detection timing, is output; and
- an identifying step of identifying a predetermined reference reflection surface among the plurality of reflection surfaces, based on the measured interval measured by the measuring step and a reference interval that corresponds to a rotation speed of the drive motor at a time when the measured interval was measured by the measuring step, the reference interval being among a plurality of reference intervals that have preliminarily been set in correspondence with the plurality of predetermined specific speeds and are each an interval between the detection timing and the output timing.

* * * * *